Feb. 5, 1952  W. M. WELLS, II  2,584,311
SLIDING BACK FOR PRESS TYPE CAMERAS
Filed May 9, 1950  3 Sheets-Sheet 1

William M. Wells II
INVENTOR.

Feb. 5, 1952 W. M. WELLS, II 2,584,311
SLIDING BACK FOR PRESS TYPE CAMERAS
Filed May 9, 1950 3 Sheets-Sheet 2

William M. Wells II
INVENTOR.
BY
Attorneys

Feb. 5, 1952 W. M. WELLS, II 2,584,311
SLIDING BACK FOR PRESS TYPE CAMERAS
Filed May 9, 1950 3 Sheets-Sheet 3
Fig. 5
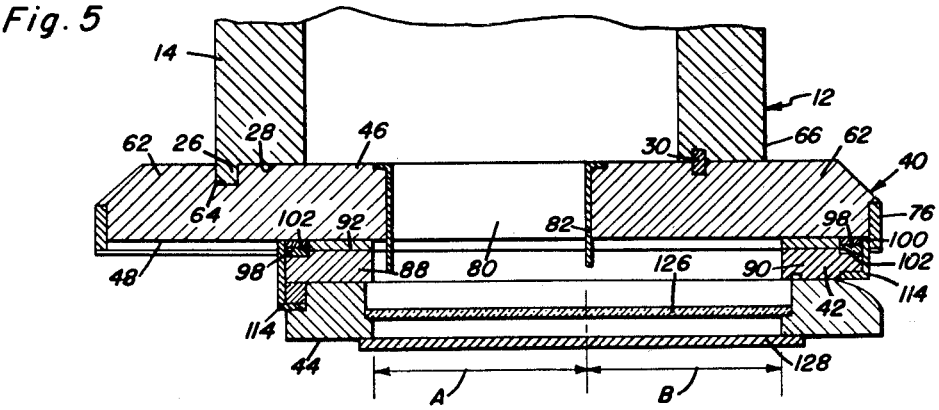
Fig. 7
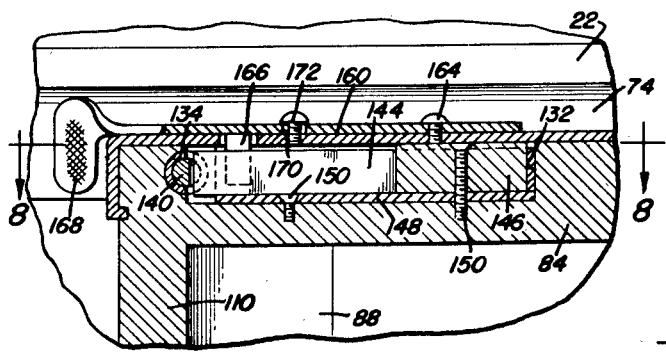
Fig. 6
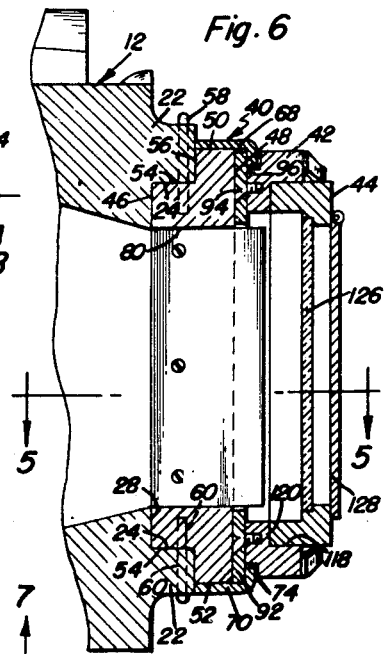
Fig. 8
William M. Wells II
INVENTOR.
BY
Attorneys Patented Feb. 5, 1952

2,584,311

UNITED STATES PATENT OFFICE 2,584,311

SLIDING BACK FOR PRESS TYPE CAMERAS

William M. Wells, II, Columbia, S. C.

Application May 9, 1950, Serial No. 160,833

2 Claims. (Cl. 95—37)

This invention comprises novel and useful improvements in camera attachments, and more particularly pertains to a multiplying back for cameras.

An important object of this invention is to provide a multiplying back for cameras which may be readily attached to, or detached from a camera with but minor alterations in the camera casing, which multiplying back will permit a plurality of exposures to be made on separate areas of a single film.

Another object of this invention is to provide a multiplying back for cameras in accordance with the foregoing objects, in which the relatively sliding members of the multiplying back are maintained in light sealing engagement with each other in an improved manner.

A further object of this invention is to provide a multiplying back in accordance with the foregoing objects, in which the same camera platen may be used either directly or on the camera, on the multiplying back attachment when the latter is mounted on the camera, so that the film holder or film pack adapter may be inserted on the multiplying back in the same manner as it is inserted on the camera itself.

Yet another object of this invention is to provide a multiplying back attachment for cameras in accordance with the foregoing objects, which multiplying back has an improved means for locking the relatively moving parts of the attachment in their adjusted positions.

An important feature of this invention resides in the provision of a pair of shoes carried by the carriage body and resiliently biased into engagement with the face of the backing plate, to prevent undesirable entrance of light between the carriage body and the backing plate.

Another feature of this invention resides in the provision of a carriage locking mechanism which is disposed in the frame of the carriage body, and which resiliently urges a locking pin into engagement with the guide members of the sliding back body.

These, together with various ancillary objects and features, are attained by this device, a preferred embodiment of which has been illustrated by way of example only in the accompanying drawings, wherein:

Figure 5 is a fragmentary horizontal sectional view of the multiplying back attachment shown mounted upon the camera;

Figure 6 is a vertical sectional view of the multiplying back attachment shown mounted upon the camera;

Figure 7 is a vertical sectional view of the sliding carriage body, taken substantially on the plane 7—7 of Figure 8, and showing the details of the construction of the carriage body locking mechanism;

Figure 8 is a horizontal sectional view taken substantially on the plane 8—8 of Figure 7, and further showing the details of the carriage body locking mechanism.

Figure 1:
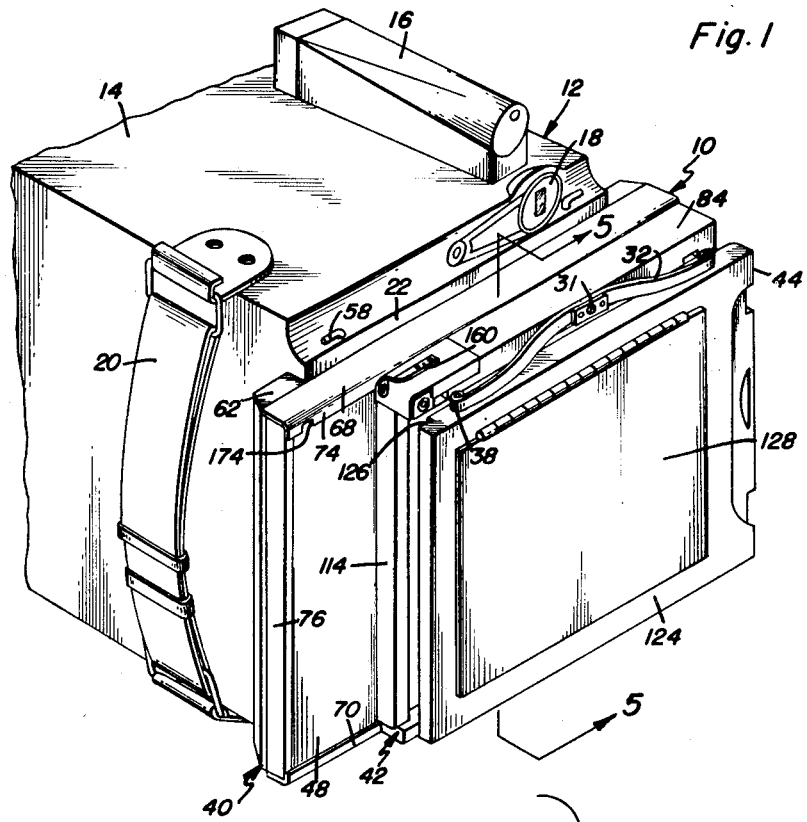
Figure 1 is a fragmentary perspective elevational view of a carriage, with the multiplying back attached thereto.

It has been found that in the taking of pictures within certain ranges of the camera, the entire area of the film is not utilized to the best advantage. An important object of this invention is therefore to provide an attachment for cameras which will selectively position a predetermined area of the film to be exposed by the camera, while shielding the rest of the film from exposure.

It is also a desideratum of this invention to lower the cost of the attachment, and make the same more compact, and for this reason the carriage body of the multiplying back attachment is designed so that the platen which fits the camera back can be interchangeably mounted upon the carriage body.

Referring now more specifically to the accompanying drawings wherein like numerals designate similar parts throughout the various views, it will be seen that there is provided a multiplying back attachment indicated generally by the numeral 10 which is adapted to be mounted upon the back of a camera 12 in order to expose a predetermined area of the film.

The camera 12, which is of conventional structure, consists generally of a casing 14 upon which is mounted a viewer 16, and an auxiliary viewer 18, together with a carrying strap 20.

The rear wall 28 of the camera casing 14 is provided, adjacent its upper and lower edges, with parallel rearwardly extending ribs 22 which ribs have registering faces 24 between which is received a conventional platen (not shown). One of the sides of the rear wall 28 of the camera casing is provided with a platen stop 26, which is in the form of an upstanding rib, the outer surface of which camera stop terminates below the outer surface of the ribs 22 so that the platen may overlie the same, in light sealing engagement therewith. The other side of the rear wall 28 is conventionally provided with a recess 30 which is adapted to receive the corresponding keyed film pack holder. The platen which is shown in Figure 1 as being mounted upon the multiplying back attachment, is conventionally mounted upon the rear of the camera by means of the screws 31 which secure the spring members 32 to the ribs 22, the screw 31 being received in the internally threaded sleeve 34. Suitable recesses 36 are provided in the registering faces 24 of the ribs 22, in order to receive the enlarged end portions 38 of the spring members 32, when the platen is moved into engagement with the rear wall 28 of the camera casing 14. The structure thus far described is conventional, and forms no part of this invention, it merely being set forth in order that the construction and operation of the attachment 10 may be more fully understood.

The attachment 10 includes generally a backing plate 40 which is adapted to be mounted in light sealing engagement on the back of the camera casing 14, and a sliding carriage body 42 which is longitudinally reciprocably mounted upon the backing plate 40, and which carriage body is adapted to receive a conventional platen 44, the carriage body 42 being so constructed that the platen 44 may be interchangeably used upon the carriage body, or upon the back of the camera casing 14, in the conventional manner.

The backing plate 40 may be formed of a unitary substantially rectangular body having a front wall 46 and a rear wall 48. In order that the front wall 46 of the backing plate 40 may abut against the rear wall 28 of the camera casing 14, in light sealing engagement therewith, the rear wall of the backing plate is longitudinally rabbeted adjacent the upper and lower edges 50 and 52 thereof so that the upper and lower walls 54 of the rabbet snugly embrace the registering faces 24 of the ribs 22, the forward faces 56 of the rabbet engaging the outer surfaces of the ribs 22. It will thus be clearly seen, by reference to Figure 6 of the drawings, that the backing plate 40 may be mounted upon the rear of the camera casing, and in light sealing engagement therewith, without the necessity of altering the camera casing in any substantial manner, any suitable means being provided for locking the backing plate 40 to the casing 14, which means may conveniently consist of the pins 58 which are received in the aligned bores 60 in the ribs and in the backing plate. Obviously, the bores and the pins 58 may be suitably threaded in order to prevent the accidental withdrawal of the pins from the bores.

Referring now to Figure 5 of the drawings, it will be seen that the backing plate 40 extends over the sides of the casing 14 as at 62 in order to provide a trackway upon which the carriage body 42 is slidably mounted. The forward wall 46 of the backing plate 40 is transversely recessed as at 64, adjacent one end thereof to receive the platen stop rib 26 on the back of the camera casing 14, and a suitable key 66 is mounted upon the forward wall 46 adjacent the other end of the backing plate 40, which key is received in the recess 30, to provide a light seal between the sides of the camera casing and the backing plate.

A pair of upper and lower guide members 68 and 70 respectively are mounted upon the upper and lower edges of the backing plate 40, as by the fasteners 72, each of which guide members has an inwardly extending flange 74 which terminates in spaced relation to the rear wall 48 of the backing plate. The carriage body 42 is longitudinally slidably carried by these guide members, in a manner more fully set forth hereinafter, suitable carriage stops 76 being mounted, as by fasteners 78 upon the sides of the backing plate 40, in order to prevent the carriage from being moved past the edge of the backing plate, particularly when there is film in the camera, which film would be exposed by the resultant admission of light between the carriage body and the backing plate.

The backing plate 40 is preferably centrally apertured as at 80, which aperture is provided with the flanged shields 82 on the sides thereof, the aperture and shields determining the size of the exposed area of the film.

Figures 2, 3, 4:
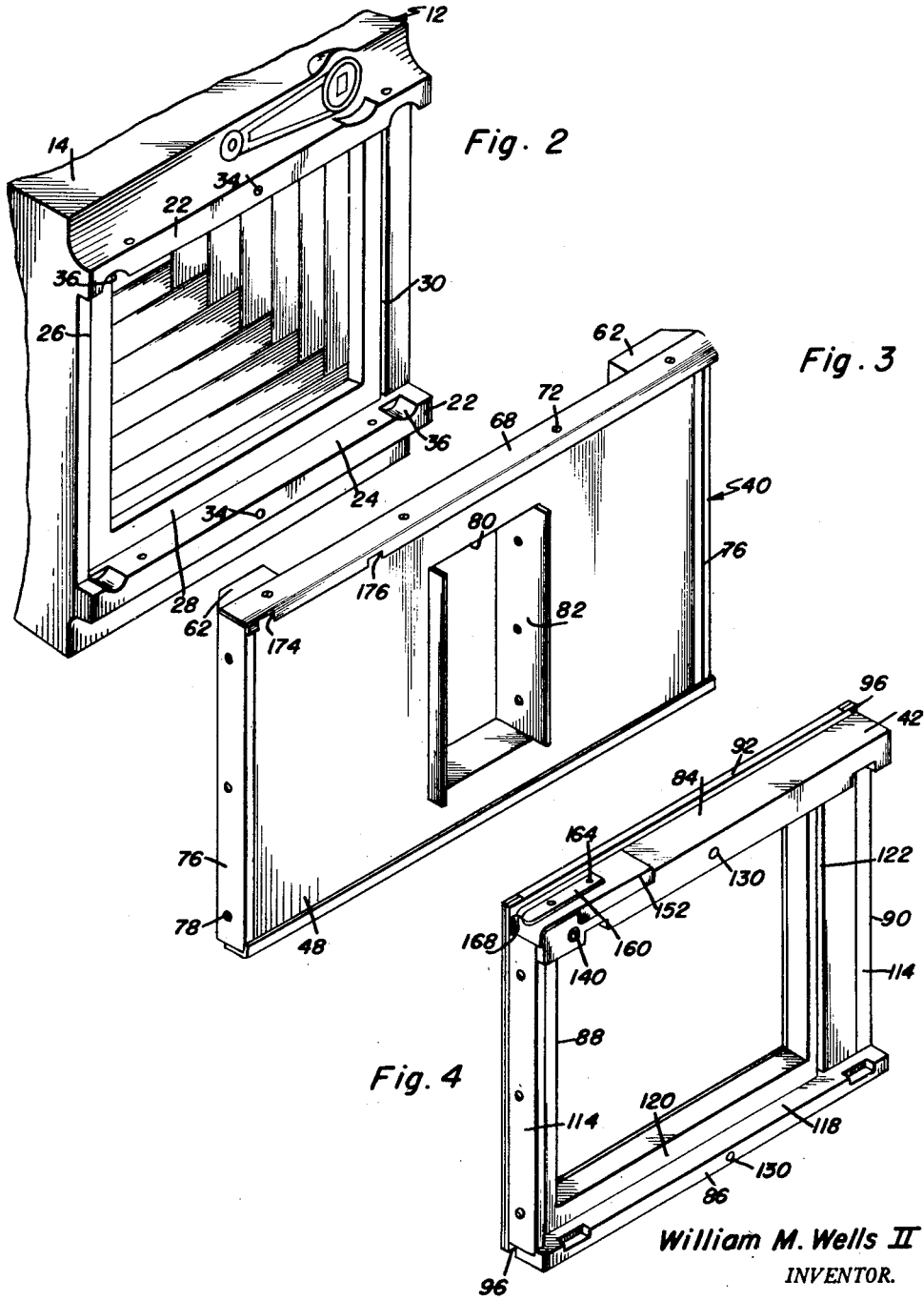
Figure 2 is a fragmentary perspective elevational view of the back of the camera with the platen removed therefrom.
Figure 3 is a perspective elevational view of the backing plate which is adapted to be detachably secured to the back of the camera.
Figure 4 is a perspective elevational view of the sliding carriage body which is movably mounted on the backing plate.

The carriage body 42, which, as previously stated, is slidably mounted upon the backing plate 40, consists generally of upper and lower frame forming members 84 and 86 and first and second side forming members 88 and 90. A substantially rectangular carriage plate 92 is dimensioned so as to be slidably received between the guides 68 on the upper and lower walls of the backing plate 40, between the inwardly extending flanged portions of the guide members and the registering rear wall 48 of the backing plate. This carriage plate, as will be seen from a consideration of Figure 4 of the drawings, is centrally apertured so as to provide a frame-like structure.

Referring now to Figure 6 of the drawings, it will be seen that the carriage plate 92 is secured to the carriage body, as by fasteners 94, the upper and lower frame forming members 84 and 86 being suitably recessed adjacent the carriage plate, as at 96, to receive the inwardly extending flanges 74 of the guide members 70. It will thus be seen that the carriage body 42, the carriage plate 92, and the backing plate 40 with the guide members 68 and 70 cooperate to provide a relatively slidable joint which is effective to prevent the introduction of light between the carriage body and the backing plate adjacent the upper and lower walls of the latter.

In order to prevent the introduction of light between the sides of the carriage body 42, and the adjacent rear face of the backing plate 40, light sealing shoes 98 are mounted upon the forward surface of the side forming members 88 and 90, each of which shoes carries a resilient pad 100 on the backing plate engaging surface thereof. As will be more clearly seen from a consideration of Figure 5 of the drawings, the shoes 98 are received in a complementary recess 102 in the forward edges of the side forming members 88 and 90, suitable springs 104 being received through transverse bores 106 in both the first and second side forming members, which springs yieldingly engage the shoes 98, through the medium of a small cylindrical grommet 108. The construction of both the first and second side forming members 88 and 90 is thus far the same, and although only a description of one of the sides has been set forth, it is to be understood it applies equally to both of the side members. The first side forming member 88 is however provided with a platen stop strip 110, which corresponds to the platen stop 26 carried by the camera casing 14, and which platen stop strip is provided with a bore 112, in axial alignment with the bore 106 in the side forming member, which axially aligned bores receive the aforementioned spring 104, the platen stop strip being secured in any desired manner to the side forming member 88. Suitable L-shaped retaining irons 114 are mounted upon each of the side forming members 88 and 90, the L-shaped retaining iron on the side 88 guidingly retaining the shoes 98 within the recesses 102, the other leg thereof overlying the platen stop strip 110, and retaining the springs 104 in yielding engagement with the shoes 98. As the second side forming member 90 of the carriage body 42 is not provided with a platen stop strip, the retaining iron merely overlies the rear edge of the carriage body, as best shown in Figure 5 of the drawings, and slidably retains the shoes 98 within the recess 102.

Additionally, each of the shoes 98, on both of the side forming members 88 and 90, are provided with longitudinally extending tabs 116 which are adapted to underlie the inwardly extending flanges 74 of the guide forming members 70.

Since, as previously stated, the carriage body 42 is so constructed that it will receive the same platen or ground glass holder 44, which was originally attached to the back of the camera casing 14, it necessarily follows that the rear of the carriage body 42 be formed supplementary to the rear of the camera casing. For this purpose, the rear edge of the upper and lower frame forming members 84 and 86 are longitudinally rabbeted to provide an inner wall 118 and an inwardly extending flange 120 against which the platen 44 abuts. The carriage stop strip 110, which is encased by the retaining irons 114 on the first side forming member of the carriage body extends between the upper and lower frame forming members, and provides a stop, similar to the platen stop 26 on the back of the camera casing 14, the second side forming member 90 being provided with a recess 122 to receive the corresponding key on the film pack holder (not shown).

The platen or ground glass holder is of conventional structure, as previously stated, and consists generally of a rectangular frame 124 having a recess 126 along one edge thereof, which recess receives the platen stop strip 110. A suitable ground or frosted glass 126 is mounted within the frame, and a cover plate 128 is hinged to the rear of the platen body so as to selectively expose the ground glass 126, in a manner well understood in the art. The platen 44 is movably mounted upon the carriage body 42, so as to resiliently bias a film pack holder (not shown) into yielding engagement with the carriage body, by means of the aforementioned spring members 32, which spring members as shown more clearly in Figure 1 of the drawings are mounted by means of a fastening screw 31 which is received in a correspondingly internally threaded sleeve 130.

In order to selectively lock the carriage body 42 in predetermined longitudinally adjusted positions relative to the backing plate, so as to thereby selectively position different areas of a single film adjacent the aperture 80 to be exposed, there is provided a locking mechanism which is carried by the carriage body 42. In order to make the device more compact, it is intended that the locking mechanism be housed within the carriage body 42, and for this purpose the upper frame forming member 84 is provided with a substantially rectangular recess 132 which opens into the outer face thereof, between the forward and rear faces of the carriage body. A transversely extending bore 134 extends through the upper frame member 84, which bore, as best shown in Figure 7 of the drawings, communicates with a recess 132. A sleeve 136 which is notched at 138 intermediate its ends is snugly received in the bore 134, the notched portion thereof communicating with the recess 132, a suitable locking pin 140 being slidably received in the bore and being provided with a transverse slot 142 to receive an actuating member, to be described hereinafter.

Figure 9:
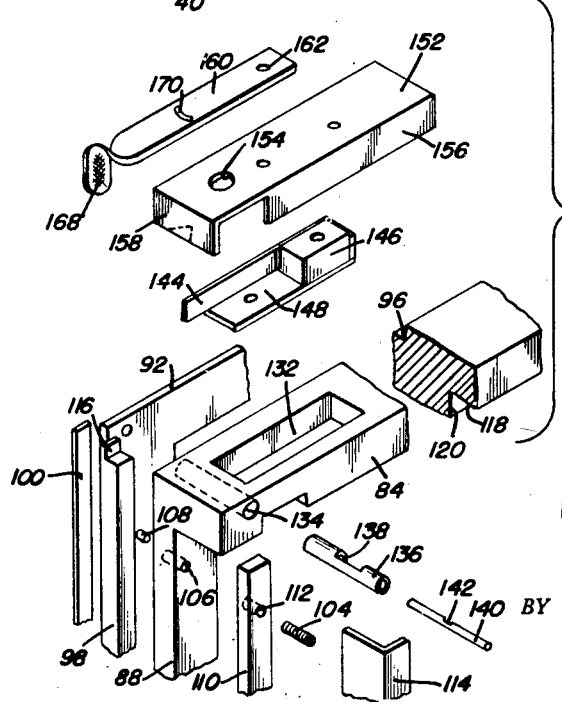
Figure 9 is a fragmentary exploded view of the carriage body assembly.

The actuating member includes a substantially L-shaped spring 144 which has one leg thereof extending into the slot 142, and the other leg thereof being retained by means of a block 146 in abutting engagement with the opposing end wall of the recess 132. A suitable plate-like member 148 underlies the L-shaped spring to guide the latter as it is shifted within the recess 132, the block 146 and the plate member 148 being secured to the upper frame forming member 88, by means of suitable fasteners 150. A suitable shield 152, best shown in Figure 9 of the drawings, overlies the recess 132 and has an aperture 154 through which an actuator, to be described hereinafter extends. The shield 150 may be provided with downwardly depending flanges 156 and 158 which respectively embrace the sides of the upper frame forming member, and the ends of the abutting side forming member 88.

An actuating bar 160 is provided with a bore 162 adjacent one end thereof which bore receives a pivot bolt 164, by means of which the actuating bar 160 is pivotally mounted to the upper frame forming member, the bar 160 also being provided with an inwardly extending tab 166 which extends through the bore 154 in the shield member 150, and abuts against the free leg of the spring member 144 to urge the latter into pin releasing position. As is apparent, the actuating bar 160 may be provided with a handle forming portion 168 and also an arcuate slot 170 which may receive a suitable pin 172 to limit the pivotal movement of the bar.

The locking pin 140 is selectively received within suitable apertures 174 and 176 positioned at predetermined longitudinally spaced points in the inwardly extending flange 74 of the upper guide member 68. In order to provide a more positive lock, it is intended that the carriage plate 92 also be apertured, in axial alignment with the bore 134 in the carriage body, so that the pin 140 will extend through the slot in the flange 74 of the guides 68 and into the carriage plate, in a manner more readily apparent from a consideration of Figure 8 of the drawings.

In operation, the multiplying back attachment is mounted upon the conventional camera 12, by merely removing the screws 31 from the internally threaded sleeve 34, and thereby removing the platen 44 from the back of the camera casing 14. The backing plate 40 is then positioned on the back of the camera casing, and pins 58 inserted into the aligned bores thereby locking the two together, the platen 44 then being mounted upon the carriage body 42, by merely inserting the screws 31 into the internally threaded sleeve 130 in the carriage body.

Assuming that the locking pin is received in the slot 176 in the flange 74, then only a portion of the carriage body 42 (indicated at A in Fig. 5), and consequently only a portion of the film will be aligned with the aperture 80 so as to be exposed when the camera is used. The actuating bar 160 is then pivoted rearwardly about the fastener 164, thereby releasing the pin 140 from locking engagement with the recess 176. The carriage body 42 is then longitudinally shifted relative to the backing plate 40 and the pin 140 released, so that the spring member 144 may resiliently urge the pin into locking engagement with a second recess 174 in the guide members 68 whereby a different area B of the film carried by the carriage body will be aligned with the aperture 80 to be selectively exposed. In this manner, the film which is carried by the carriage body 42 will be selectively positioned relative to the aperture 80 so that only predetermined areas thereof may be exposed at one time.

From the foregoing, it is felt that the operation and construction of the device will be readily understood by those skilled in the art, and further discussion is thereby believed to be unnecessary. However, since numerous modifications will readily occur to those skilled in the art after a consideration of the foregoing specification and accompanying drawings, it is not intended to limit the invention to that shown and described, but all suitable modifications may be resorted to falling within the scope of the appended claims.

Having described the invention, what is claimed as new is:

1. A multiplying back for cameras comprising a support plate having an aperture therein, a pair of L-shaped guide members each having a first leg thereof secured to opposite edges of said support plate, the second leg of said guide members lying parallel to the face of said support plate, a carriage plate slidably received between said support plate and said second leg of said guide members, a carriage body secured to said carriage plate for movement therewith, a shoe carried by each end wall of said carriage body, means yieldingly biasing said shoes into light sealing engagement with said support plate, the side walls of said carriage body being longitudinally recessed, said second leg of said guide members being received in said recess, the side walls of said carriage body having a transverse bore therein intersecting said recess, said second leg of said guide member having an aperture therein, a pin in said bore selectively movable into said aperture to lock said carriage body in predetermined longitudinally adjusted positions, the side wall of said carriage body having a slot therein transverse said lock pin bore, said locking pin having a groove therein, and a spring disposed in said slot and extending into said groove yieldingly urging said pin towards said carriage plate.

2. The combination of claim 1 including means carried by said carriage body selectively urging said pin away from said carriage plate.

WILLIAM M. WELLS, II.

REFERENCES CITED

The following references are of record in the file of this patent:

UNITED STATES PATENTS

| Number | Name | Date |
| --- | --- | --- |
| 771,282 | Smith | Oct. 4, 1904 |
| 1,045,539 | Folmer | Nov. 26, 1912 |
| 1,544,970 | Folmer | July 7, 1925 |
| 1,933,889 | Burnell | Nov. 7, 1933 |